(12) United States Patent
Khlif et al.

(10) Patent No.: US 6,784,398 B2
(45) Date of Patent: *Aug. 31, 2004

(54) APPARATUS FOR CONTROLLING TWIST CURVATURE OF A DISC HEAD SLIDER

(75) Inventors: Mohamed-Salah H. Khlif, Fridley, MN (US); Richard A. Strom, Eagan, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/268,857

(22) Filed: Oct. 10, 2002

(65) Prior Publication Data

US 2003/0029847 A1 Feb. 13, 2003

Related U.S. Application Data

(62) Division of application No. 09/594,335, filed on Jun. 15, 2000, now Pat. No. 6,548,009, which is a continuation-in-part of application No. 09/562,830, filed on May 1, 2000, now Pat. No. 6,295,719, which is a division of application No. 08/662,849, filed on Jun. 12, 1996, now Pat. No. 6,073,337.

(60) Provisional application No. 60/201,241, filed on May 1, 2000.

(51) Int. Cl.[7] .............................................. B23K 26/00
(52) U.S. Cl. ................................ 219/121.65; 219/121.6
(58) Field of Search ....................... 219/121.66, 121.85, 219/121.65, 121.6, 121.68; 360/234.3; 425/174.4

(56) References Cited

U.S. PATENT DOCUMENTS

| | | | |
|---|---|---|---|
| 4,910,621 A | 3/1990 | Matsuda et al. | ............. 360/104 |
| 5,156,704 A | 10/1992 | Kemp | ......................... 156/655 |
| 5,220,471 A | 6/1993 | Matsuzaki | .................. 360/103 |
| 5,237,476 A | 8/1993 | Bischoff et al. | ............ 360/126 |
| 5,256,850 A | 10/1993 | Maegawa et al. | ...... 219/121.69 |
| 5,266,769 A | 11/1993 | Deshpande et al. | ..... 219/121.69 |
| 5,303,105 A | 4/1994 | Jorgenson | .................... 360/106 |
| 5,442,850 A | 8/1995 | Kerth | .......................... 29/603 |
| 5,982,583 A | 11/1999 | Strom | ......................... 360/103 |
| 6,073,337 A | 6/2000 | Strom | ..................... 29/603.12 |
| 6,075,604 A | 6/2000 | Crawforth et al. | .......... 356/371 |
| 6,108,170 A * | 8/2000 | Crawforth et al. | |
| 6,228,873 B1 | 5/2001 | Lundquist et al. | ....... 360/234.6 |
| 6,295,719 B1 * | 10/2001 | Strom | |
| 6,501,048 B1 * | 12/2002 | Strom | |
| 6,552,302 B2 * | 4/2003 | Matsushita | |

OTHER PUBLICATIONS

Photograph of TDK TPC ABS slider from Quantum Fireball 2 Drive, publicly on sale at least as early as Jan. 1, 1996.
Photograph of TDK AAB slider from Pike Disc Drive, publicly on sale at least as early as Jan. 31, 1996.
R.W. Stinnett and E.L. Neau "Ion Beam Surface Treatment", QM Technologies Inc. *An Interim Report*, Summer 1996, pp. 1–16.
R. Ebbutt and S. Danyluk, Ilan Weisshaus, "Method to Evaluate Damage Induced By Dicing and Laser Cutting of Silicon Wafers".
Office Action dated Dec. 7, 2001 for Ser. No. 09/619,241.
Office Action dated Dec. 13, 2002 for Ser. No. 10/190,642.

* cited by examiner

*Primary Examiner*—Geoffrey S. Evans
(74) *Attorney, Agent, or Firm*—Westman, Champlin & Kelly (57) ABSTRACT

An apparatus for adjusting twist curvature of a slider is provided, wherein the slider has a bearing surface, a back surface, which is opposite to the bearing surface, a longitudinal axis and a transverse axis. The apparatus includes a light source adapted to produce a light beam capable of altering material stresses in a working surface of the slider. The apparatus further includes an apparatus for obtaining a measure of the twist curvature of the bearing surface and for scanning the light beam across the working surface in a pattern selected to alter material stresses in the working surface asymmetrically with respect to the longitudinal axis and the transverse axis based on the measure of the twist curvature so as to induce a change in the twist curvature.

14 Claims, 9 Drawing Sheets

APPARATUS FOR CONTROLLING TWIST CURVATURE OF A DISC HEAD SLIDER

CROSS-REFERENCE TO RELATED APPLICATION

This application is a divisional of U.S. application Ser. No. 09/594,335, filed Jun. 15, 2000 and issued as U.S. Pat. No. 6,548,009, which claims the benefit of U.S. Provisional Application No. 60/201,241, filed May 1, 2000 and is a continuation-in-part of U.S. application Ser. No. 09/562, 830, filed May 1, 2000 and issued as U.S. Pat. No. 6,295, 719, which is a divisional of U.S. application Ser. No. 08/662,849, filed Jun. 12, 1996 and issued as U.S. Pat. No. 6,073,337.

FIELD OF THE INVENTION

The present invention is related to disc drive data storage systems and, more particularly, to a method of controlling curvature of a transducing head, such as a hydrodynamic bearing slider.

BACKGROUND OF THE INVENTION

A typical disc drive includes one or more rigid discs coated with a magnetizable medium for storage of digital information in a plurality of circular, concentric data tracks. The discs are mounted on a spindle motor, which causes the discs to spin and the surfaces of the discs to pass under respective head gimbal assemblies (HGAs). Head gimbal assemblies carry transducers which write information to and read information from the disc surface. An actuator mechanism moves the head gimbal assemblies from track to track across the surfaces of the discs under control of electronic circuitry. The actuator mechanism includes a track accessing arm and a load beam for each head gimbal assembly. The load beam provides a preload force which urges the head gimbal assembly toward the disc surface.

The head gimbal assembly includes a gimbal and a slider. The gimbal is positioned between the slider and the load beam to provide a resilient connection that allows the slider to pitch and roll while following the topography of the disc. The slider includes a slider body having a bearing surface, such as an air bearing surface, which faces the disc surface. As the disc rotates, the air pressure between the disc and the air bearing surface increases, which creates a hydrodynamic lifting force that causes the slider to lift and fly above the disc surface. The preload force supplied by the load beam counteracts the hydrodynamic lifting force. The preload force and the hydrodynamic lifting force reach an equilibrium which determines the fly height of the slider. The transducer is typically mounted at or near the trailing edge of the slider.

In some applications, the slider flies in close proximity to the surface of the disc. This type of slider is known as a "pseudo-contact" slider, since the bearing surface of the slider can occasionally contact the surface roughness of the disc. In other applications, the slider is designed to remain in direct contact with the disc surface with substantially no air bearing. These sliders are referred to as "contact recording" sliders.

It is often desirable to fabricate a slider such that the bearing surface has a positive curvature along the length and width of the slider. Length curvature is known as crown curvature. Width curvature is known as cross or camber curvature. The proper setting and control of crown and cross curvature improves fly height variability over varying conditions, improves wear on the slider and the disc surface, and improves takeoff performance by reducing stiction between the slider and the disc surface. In addition, the slider preferably has no twist about its longitudinal or transverse axes. While twist does not directly effect fly height, high twist values, either positive or negative, can cause other negative tribological effects, such as increasing wear and inducing roll.

In a typical slider fabrication process, curvature is controlled by lapping the bearing surface on a spherically-shaped lapping surface or on a flat lapping surface while rocking the slider body back and forth in the direction of the desired curvature. The amount of curvature is determined by the radius of the rocking rotation. This lapping process is difficult to control and results in large manufacturing tolerances. More efficient and controllable methods of effecting air bearing surface curvature are desired.

U.S. Pat. No. 5,442,850 discloses a method of controlling crown and cross curvature by inducing a preselected amount of compressive stress within a selected section of the bearing surface by impinging the section with particles for a preselected amount of time. U.S. Pat. No. 5,266,769 discloses a process of controlling slider crown and cross curvature in which the air bearing surfaces are first patterned and then a chosen pattern of stress is produced on the back side of the slider by laser oblation or sand blasting to selectively remove stressed material and thereby create a desired crown and cross curvature of the bearing surface.

U.S. Pat. No. 4,910,621 discloses a method of producing crown and cross curvature in a slider by creating a groove in the leading edge of the slider, placing a sealing material in the groove and then melting and stiffening the sealing material in the groove. The sealing material has an adhesive property upon melting and a shrinking property upon stiffening which causes lengthwise curvature at the leading edge of the slider. U.S. Pat. No. 5,220,471 discloses a slider having a longitudinal linear groove formed in a surface which is opposite the disc-opposing surface. The groove creates tensile stresses which cause the disc-opposing surface of the slider to be a curved surface in a convex form.

U.S. Pat. No. 5,982,583 discloses a method of effecting slider curvature through the application of laser-induced anisotropic tensile stress, which allows one of the crown and cross curvature to be changed to a greater extent than the other curvature. In addition, Seagate Technology, Inc. has used a process of creating scratches on the back side of the slider (the side opposite to the air bearing), lapping the bearing surface flat and then laser heat treating the scratches to reduce compressive stress caused by the scratches and thereby cause a positive curvature change in the bearing surface. This process is discussed in U.S. application Ser. No. 08/662,849, Filed Jun. 12, 1996.

SUMMARY OF THE INVENTION

One embodiment of the present invention relates to an apparatus for adjusting twist of a disc head slider having a bearing surface, a back surface, which is opposite to the bearing surface, a longitudinal axis and a transverse axis. The apparatus includes a light source, which is adapted to produce a light beam capable of altering material stresses in a working surface of the slider. The working surface includes the bearing surface or the back surface. The twist of the bearing surface is measured, and a scanner scans the light beam across the working surface in a pattern selected to alter material stresses in the working surface asymmetrically with respect to the longitudinal axis and the transverse axis based on the measure of the twist curvature so as to induce a change in the twist.

DETAILED DESCRIPTION OF ILLUSTRATIVE EMBODIMENTS

Figure 1:
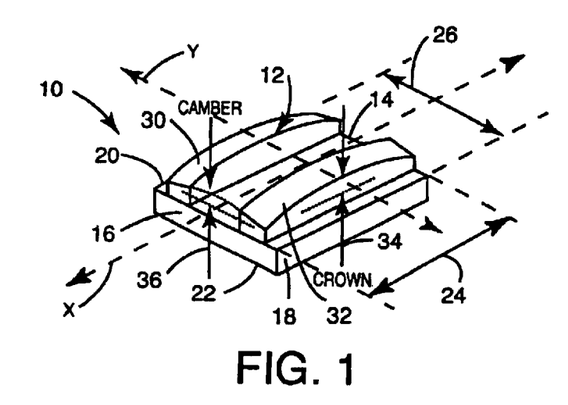
FIG. 1 is a perspective view of a disc head slider, as viewed from a bearing surface, which illustrates cross and crown curvature.

FIG. 1 is a perspective view of a disc head slider 10, as viewed from a bearing surface 12. Slider 10 has a leading edge 14, a trailing edge 16, side edges 18 and 20 and back surface 22. Slider 10 has a length 24, measured from leading edge 14 to trailing edge 16, and a width 26, measured from side edge 18 to side edge 20. In the embodiment shown in FIG. 1, bearing surface 12 includes side rails 30 and 32. However, slider 10 can include a variety of bearing surface geometries. These surface geometries can be configured for non-contact, direct-contact or pseudo-contact recording. Slider 10 carriers a read/write transducer (not shown), which is typically mounted along trailing edge 16, but can be positioned at other locations on slider 10 in alternative embodiments.

Slider 10 preferably has a positive curvature along length 24 and width 26. "Crown" curvature is a measure of the curvature of bearing surface 12 along length 24. Crown curvature is negative for a concave surface, positive for a convex surface and zero for a flat surface. "Cross" curvature is a measure of the curvature of bearing surface 12 along width 26. The sign of the cross curvature has the same convention as the sign of the crown curvature. Cross curvature is also known as "camber" curvature. A common method of measuring the crown and cross curvatures is to measure the differences 34 and 36 between the highest points along length 24 and width 26 and the lowest points along length 24 and width 26. Typical crown and cross curvatures are on the order of zero to 1.5 microinches for a "30 series" slider having a length of 49 mills and a width of 39 mills.

Figure 2:
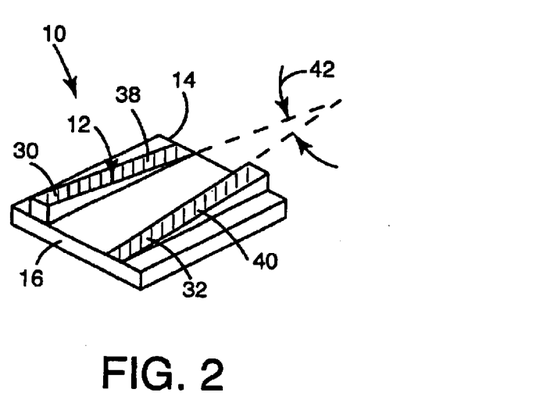
FIG. 2 is a perspective view of a disc head slider, as viewed from a bearing surface, which illustrates twist curvature.

In addition, slider 10 should have no "twist" about its longitudinal axis X or its transverse axis Y. Twist is the tilt between rails 30 and 32, which can be caused by stresses in the slider substrate material. FIG. 2 is a perspective view of slider 10 illustrating twist along slider length 24. The amount of twist can be measured by fitting planes 38 and 40 to the bearing surfaces of rails 30 and 32 and measuring an angle 42 between the fitted planes 38 and 40. The sign of angle 42 indicates the direction of twist and the relative orientation of the rails to each other.

Figure 3:
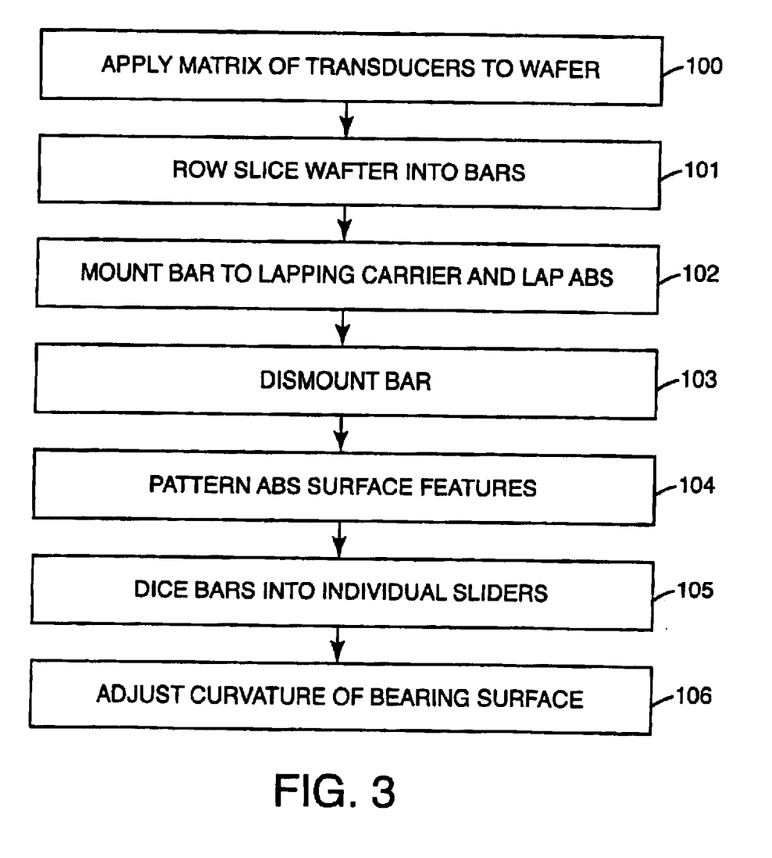
FIG. 3 is a flow chart illustrating a slider fabrication process according to one embodiment of the present invention.

The crown curvature, cross curvature and twist are controlled according to the present invention during fabrication of the slider body. FIG. 3 is a flow chart illustrating a slider fabrication process according to one embodiment of the present invention. The slider body is formed from a substrate known as a wafer. At step 100, a matrix of transducers is applied to the top surface of the wafer. At step 101, the wafer is sliced along rows into a plurality of bars. The slicing operation is typically performed with a diamond-tipped saw blade or wheel. Each bar includes a plurality of individual slider bodies, with each slider body having a corresponding transducer. The sliced surfaces become bearing surface 12 and back surface 22, while the top surface of the wafer becomes trailing edge 16 of each slider body. The slicing process induces surface stress in bearing surface 12 and back surface 22 due to plastic deformation of the surfaces. This surface stress is typically compressive. In addition, the slicing wheel can form marks in bearing surface 12 and back surface 22 due to mis-alignment of the wheel and wheel vibration. Therefore, following the slicing operation, bearing surface 12 and back surface 22 are referred to as "rough sliced surfaces."

At step 102, each bar is mounted to a carrier, and the bearing surface 12 of each bar is machined by a lapping process prior to forming the bearing features. The lapping process is controlled to obtain a target throat height or target resistance for each transducer. At step 103, the bar is dismounted from the lapping carrier. At step 104, the bearing surface features are patterned by ion milling, chemical etching or reactive ion etching (RIE), for example, with one or more masking operations. Once the bearing surface features have been formed, the bars are diced along a plurality of diced lanes into individual slider bodies, at step 105. The diced surfaces become side edges 18 and 20 shown in FIG. 1. The dicing operations can also induce surface stresses in side edges 18 and 20. The stresses in the slider substrate material following the above fabrication steps cause each slider body to have some initial or "incoming" curvature, which is typically not a desired curvature. The initial twist and crown and cross curvatures are then adjusted, at step 106, by altering the surface stresses on each slider according to the present invention.

Figure 4:
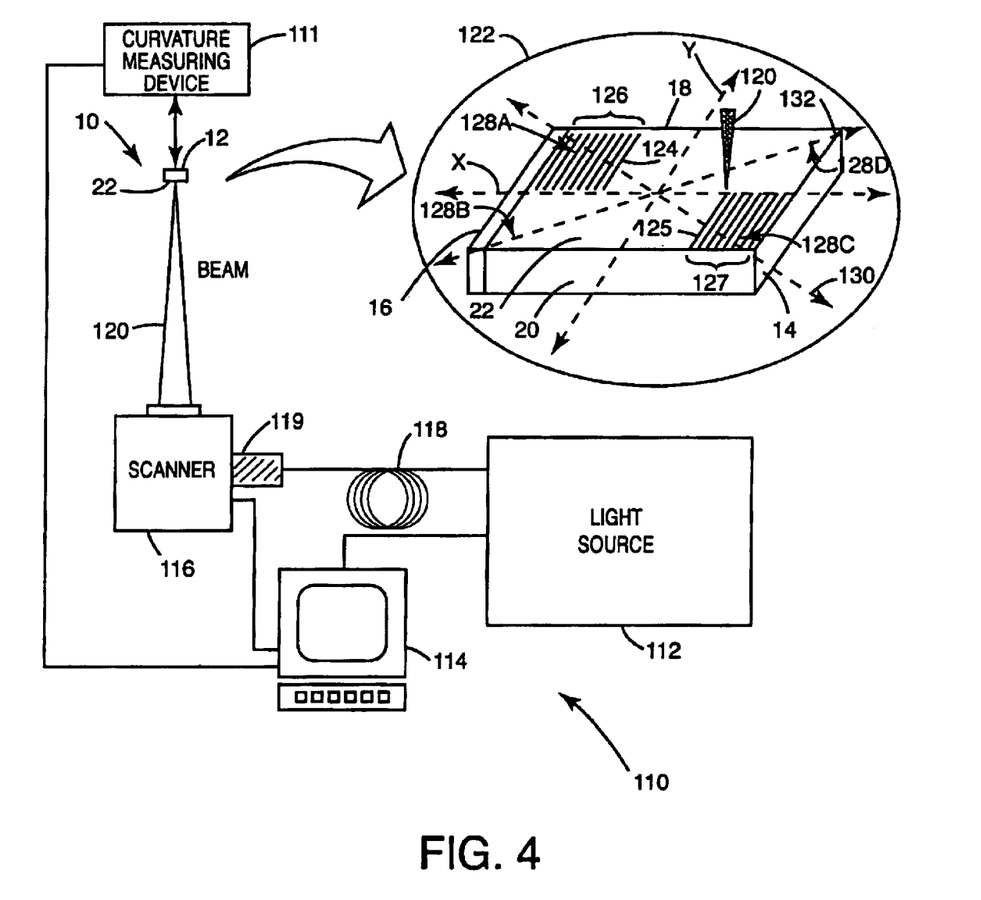
FIG. 4 is a diagram of an apparatus for adjusting twist curvature according to one embodiment of the present invention.

FIG. 4 is a diagram of an apparatus 110 for adjusting the twist of each slider 10 toward target curvature values according to predetermined specifications. Apparatus 110 includes curvature measuring device 111, light source 112, programmed computer 114, and scanner 116. Programmed computer 114 operates measuring device 111, light source 112, and scanner 116 according to a sequence of instructions stored in a memory (not shown), which is associated with the computer, and user commands provided by a user through a user interface (also not shown). The sequence of instructions, when executed by computer 114, causes apparatus 110 to measure the twist curvature (direction and amplitude) of bearing surface 12 with curvature measuring device 111 and then alter the surface stresses on the back surface 22 (or alternatively bearing surface 12) of slider 10, based on a number of factors including the twist measurement, a predetermined target value for the twist and predetermined twist response characteristics. In one embodiment of the present invention, apparatus 110 has one or more slider "nests" (not shown), wherein each nest holds a plurality of sliders 10 for treatment. Each slider is sequentially moved into a working position relative to light beam 120 and curvature measuring device 111. Measuring device 111 can include an interferometer, for example, which is capable of producing accurate and repeatable curvature measurements (i.e. "gage capable"). Other curvature measuring devices can also be used.

Apparatus 110 alters the surfaces stresses on back surface 22 by scanning light beam 120 across back surface 22 of slider 10 to melt the back surface in a selected melt pattern that is asymmetric to the longitudinal and transverse axes of the slider. The particular melt pattern and the amount of heat treatment are chosen to achieve a desired change in the twist curvature of bearing surface 12. In one embodiment, light source 112 is a fiber laser source, which generates coherent light having continuous power at a wavelength of about 1100 nm, which is delivered to scanner 116 over a 5 micrometer fiber-optic cable 118, for example. However, other heat sources or methods of altering material stresses on the working surface of slider 10 can also be used with the present invention.

Fiber-optic cable 118 is coupled to scanner 116 through a system of lenses 119, which expand the 0.5 mm diameter beam to a collimated beam of about 8 mm in diameter, for example. Scanner 116 passes the 8 mm beam through a two-axis galvanometer and then focuses the beam on back surface 22 through a flat-field objective lens. The two-axis galvanometer includes a set of two mirrors that allow planar x-y motion of the focused beam on the work surface of slider 10.

As beam 120 is scanned along the working surface of slider 10, the laser beam melts back surface 22 along very narrow and well-defined scan lines, which reduce or eliminate preexisting compressive stresses along the scan lines. When the molten material solidifies, new anisotropic tensile stress is added to back surface 22. The added anisotropic tensile stress causes the slider substrate to bulge from the surface opposite to the surface being treated. The wavelength of beam 120 is preferably in the infrared and provides for enough heating of back surface 22 without material removal. With a continuous wave laser beam, the tensile stress induced during cooling of the substrate material is aligned predominantly parallel to the scan direction. It has been found that proper placement and control of the laser scan lines can result in very localized stress management, which can be used to completely or partially remove any preexisting twist in bearing surface 12. Changes in the twist curvature can be positive or negative, depending on the preexisting twist conditions and the location of the scan lines on back surface 22 or bearing surface 12.

Detail area 122 shows an example of a laser scan melt pattern applied by scanner 116 according to one embodiment of the present invention. Beam 120 forms the melt pattern asymmetrically to longitudinal and transverse axes X and Y. For example, the melt pattern can include one or more twist control bands 126 and 127, which are located in opposing corners 128A and 128C, along diagonal 130. Bands 126 and 127 are formed of one or more laser scan lines 124 and 125, respectively. Alternatively, bands 126 and 127 can be applied in corners 128B and 128D, along diagonal 132. The melt pattern can be formed in one step or a sequence of steps, which are interleaved with one or more curvature measurements.

Once measuring device 111 has measured the initial or "incoming" twist value (magnitude and direction) of slider 10, computer 114 makes a decision as to the laser heat treatment pattern that slider 10 should receive. The sign of the measured twist value determines the location of the laser heat treatment pattern on the working surface (e.g. along diagonal 130 or diagonal 132), and the magnitude of the measured twist value determines the amount of treatment needed.

Apparatus 10 can also be used to adjust the crown and cross curvature of slider 10 by placing one or more laser scan lines in other areas of the slider, as described in more detail in co-pending U.S. Provisional Application No. 60/194,928, filed Apr. 6, 2000, and entitled "CONTINUOUS WAVE LASER-INDUCED ADJUST OF A SLIDER FLATNESS."

1. Pre-Existing Conditions that Influence the Twist Curvature Response Seen by Apparatus 110

There are numerous pre-existing conditions that influence the twist curvature response in bearing surface 12 from the scan lines produced by beam 120. These conditions include the post-slice surface condition of the slider, the laser and scanner settings, the type of slider substrate material, the twist distribution of incoming sliders and the air bearing geometry.

With respect to the post-slice surface condition of a particular slider, row slice surfaces (the bearing surface and the back surface) that have rough marks tend to absorb more of the laser power. Thus, the heat affected zone of each scan line will be wider, resulting in a proportionally greater response in the curvature change. In a typical process, rough sliders may constitute less than 5% of all sliders treated by apparatus 110. High curvature responses can be attributed to excessive shear stresses produced during the slicing operation. Some rough sliders have been observed to have a curvature response that is 100% greater than a normal curvature response.

The power setting on the laser and the speed setting on the scanner also greatly influence the resulting change in twist. In one embodiment, neither the power nor the speed is used as a process variable for effecting a desired curvature change since the response is insensitive to changes in power and speed beyond certain values. In addition, the burn pattern dimensions are extremely sensitive to changes in scanning speed due to the small area of the slider's back surface. Using either of these variables as a process variable may result in unstable design functions since the burn lines change both in depth and width for each new value of the variable.

The substrate type also influences the curvature response for a given laser treatment. For, example, a typical slider is formed from a substrate of $Al_2O_3$—TiC. If the substrate type is changed, new power and scanning speed settings may be required, along with new design functions (i.e. design curves) and/or a new laser system may be needed.

Also, the incoming twist distribution is an important factor in determining the capability of meeting certain twist curvature goals for all incoming sliders. The incoming twist distribution also effects process sigma and yield. The incoming twist distribution is effected by mounting and lapping, and variations in these processes translate into wider and shifted twist distributions.

Another very important factor is the geometry of the air bearing surface. Air bearings are now being produced that are asymmetric to the slider's longitudinal center line for providing improved flying performance at varying skew angles. With asymmetric air bearing geometries, the incoming twist distribution can be bi-polar. One type of asymmetric air bearing geometry may have a positive average of incoming twist values, and another type of asymmetric air bearing geometry may have a negative average of incoming twist values. When crown and cross curvature control techniques are used to adjust the crown and cross curvatures of the incoming sliders, the average twist values of these sliders move even farther away from the desired zero microinch target. Without twist control, a large number of these sliders may fail to meet predetermined twist specifications.

2. Twist Adjustment Capability Range of Apparatus 110

Figure 5A:
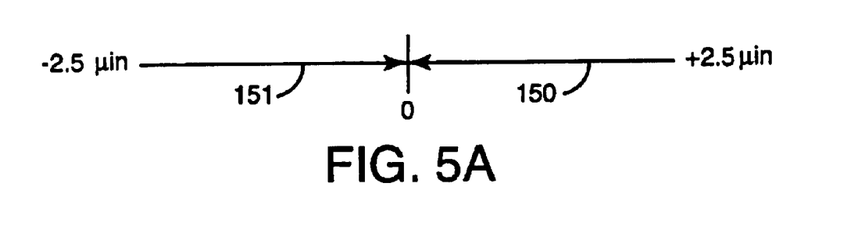
FIGS. 5A and 5B are diagrams illustrating twist adjustment capability windows for the apparatus shown in FIG. 4, according to one embodiment of the present invention.

FIG. 5A is a diagram illustrating the twist adjustment capability window for apparatus 110 according to one embodiment of the present invention, where no previous stress-based crown and cross curvature adjustments have been performed. The horizontal axis represents the amount of twist in microinches, with zero microinches being the desired twist target value. Apparatus 110 is capable of inducing a maximum change of +/−1.5 microinches in the twist value, as indicated by arrows 150 and 151, respectively. The processing capability range shown in FIG. 5A is determined by the maximum change in twist that can be achieved by laser-induced changes in the material stresses on the incoming slider and process tolerances. The maximum change depends on variable conditions, such as the type of slider substrate material, the type of laser used, future slicing technology, the slicing wheel type, imposed process tolerances, the twist measurement method, and other factors.

Figure 5B:
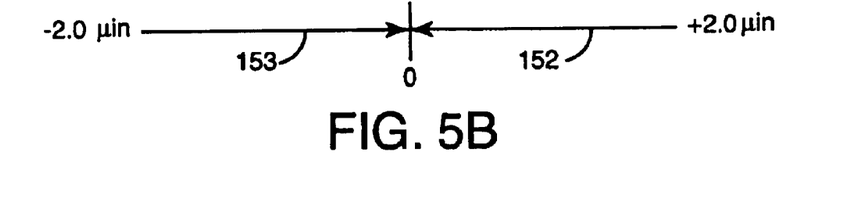

FIG. 5B is a diagram illustrating the twist adjustment capability window for apparatus 110, where previous stress-based crown and cross curvature adjustments have been performed according to the techniques disclose in the co-pending application mentioned above. In this case, apparatus 110 is capable of inducing a maximum change of +/−2.0 microinches in the twist value, as indicated by arrows 152 and 153, respectively. The reduction in the twist control capability window is caused by a reduction in the amount of post-slice compressive surface stress on which latter twist control treatments can act following prior crown and cross curvature adjustments.

Figure 6:
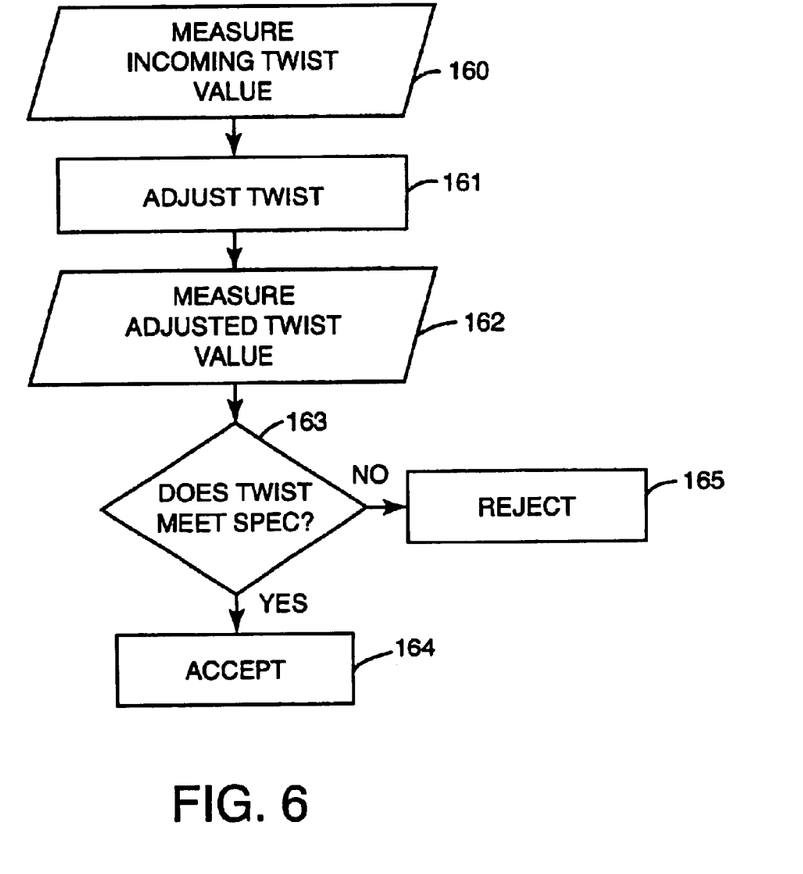
FIG. 6 is a flow chart illustrating a twist control process flow, according to one embodiment of the present invention.

FIG. 6 is a flow chart illustrating a twist control process flow according to one embodiment of the present invention. At step 160, curvature measuring device 111 (shown in FIG. 4) measures the twist value of the slider being treated, and computer 114 makes a decision about the location of treatment and the amount of treatment that slider should receive. At step 161, computer 114 operates light source 112 and scanner 116 to apply the selected treatment pattern to the working surface of the slider to induce the desired change in twist curvature. At step 162, curvature measuring device 111 measures the adjusted twist value. If the adjusted twist value is within predetermined specifications, at step 163, the slider is accepted for installation into a disc drive, at step 164. If not, the slider is rejected at step 165.

3. Twist Sensitivity to Melt Pattern and Location on Substrate

It has been found that the twist curvature response of a slider is sensitive to the location of the melt pattern on the working surface of the slider. Hence, various twist curvature responses can be obtained by varying the melt pattern and the location of the pattern on the working surface. In the examples discussed below, the melt patterns are formed on the back surface of the slider. However, it should be understood that locating such melt patterns on the air bearing surface of the slider would create generally equal and opposite results as when formed on the back surface of the slider.

Since twist is a measure of the angle between planes fitted to the rails on the air bearing surface of a slider, the measured twist value is therefore a measure of the relative vertical positions of the four corners of the slider to each other in a direction perpendicular to the longitudinal and transverse axes. Thus, any treatment that would alter the vertical position of one or more of these corners would change the magnitude of the twist value. Based on the definition of twist and how it is measured, it has been found that the twist value can be effectively controlled by selectively altering surfaces stresses on the bearing surface or the back surface of the slider in a pattern that is asymmetric to both the longitudinal and transverse axes of the slider. In particular, it has been found that large changes in twist can be realized by treating the slider surface in opposing corners of the slider, along a selected diagonal. These corners have higher bending flexibility, which has been verified with empirical data.

Figure 7A:
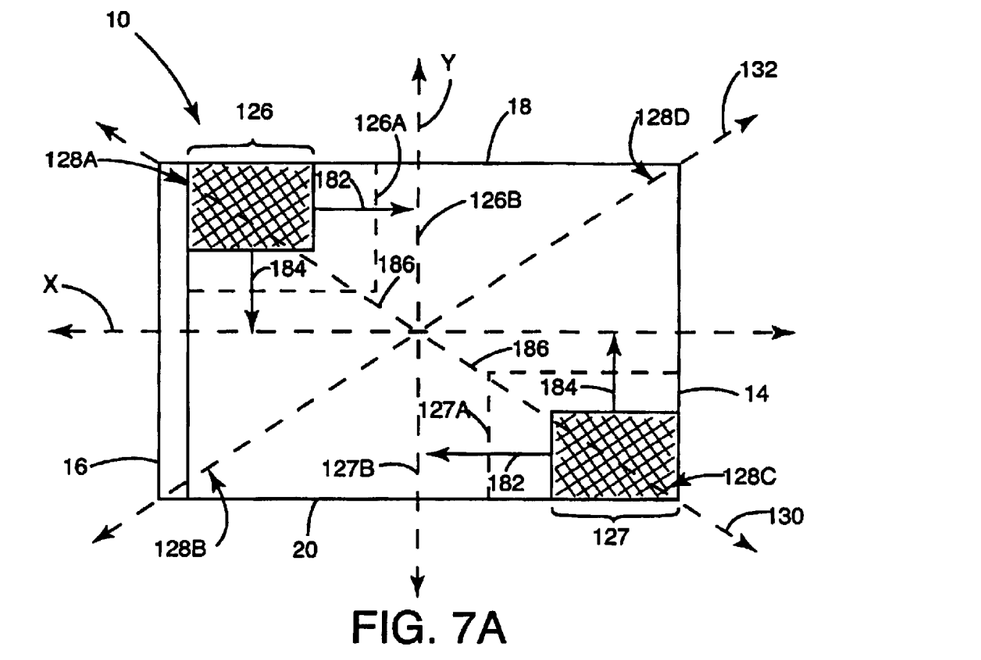
FIGS. 7A and 7B are diagrams illustrating examples of asymmetric melt patterns for treating sliders having incoming negative and positive twist values, respectively.

FIG. 7A is a diagram which schematically illustrates an example of an asymmetric melt pattern for treating a slider having an incoming negative twist value. The same reference numerals are used in FIG. 7A as were used in FIGS. 1, 2 and 4 for the same or similar elements. The asymmetric melt pattern is formed on the back surface 22 of slider 10 and has a pair of opposing twist adjust bands 126 and 127 located along diagonal 130. Bands 126 and 127 are positioned in corners 128A and 128C, respectively, of slider 10. Each twist adjust band 126 and 127 is formed by a collection of laser scan lines, such as lines 124 and 125 shown in FIG. 4.

Figure 7B:
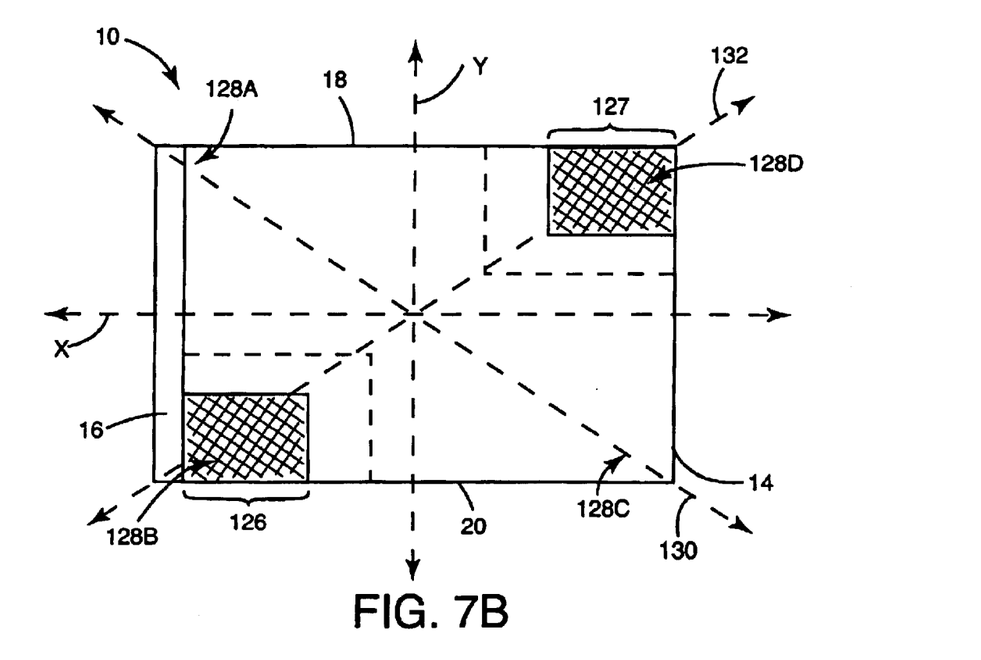

The stress changes on back surface 22 caused by bands 126 and 127 deflect corners 128A and 128C in a common direction, resulting in a positive change in the negative twist of slider 10. Although each pair of corners on one diagonal of slider 10 is preferably treated together, treatment can be applied in only one of the two corners on a specific diagonal. If slider 10 had a positive incoming twist value, bands 126 and 127 would be located along diagonal 132, in corners 128B and 128D, as shown in FIG. 7B. This location would result in a twist change in the opposite direction achieved by the location shown in FIG. 7A.

Referring back to FIG. 7A, laser treatment preferably starts with a laser scan line applied at an outermost limit of each band on back surface 22, and proceeds with subsequent scan lines positioned progressively towards an innermost limit of each band to achieve successively greater amounts of change in the twist. Various sizes of bands 126 and 127 are shown by dashed lines 126A, 126B, 127A and 127B.

The size of each band 126 and 127 can be increased in different ways in alternative embodiments of the present invention. Each band 126 and 127 can grow horizontally along longitudinal axis X as shown by arrows 182. Alternatively, each band 126 and 127 can grow vertically along transverse axis Y, as shown by arrows 184. In yet another alternative embodiment, each band 126 and 127 can grow both vertically and horizontally, along the respective diagonal 130 or 132, as shown by arrows 186. Bands 126 and 127 can have equal or distinct growth size rates.

Bands 126 and 127 can be increased through a plurality of input process variables. For example, the size of each band can be increased or decreased by varying the number of equidistant laser scan lines within each band. Alternatively, the number of laser scan lines in each band is fixed, but the line dimensions (length or width) are allowed to vary from one slider to the next based on the amount of twist adjustment that is needed. A given band size would therefore result in a specific twist response or change. Within a given band, the order of scanning the laser lines may or may not effect the twist response, depending on the particular application.

In another embodiment, the size of bands 126 and 127 have fixed dimensions. With the size of bands 126 and 127 fixed, other parameters are used as process variables. For example, the number of scan lines in each band 126 and 127 can be varied by varying the line-to-line spacing within each band. Alternatively, the number of scan lines and the line-to-line spacing are both fixed, while other inputs such as laser power or scanning speed can serve as process input variables. The collection of laser scan lines in each band 126 and 127 can be parallel to longitudinal axis X, parallel to transverse axis Y or at an angle that is perpendicular to the respective diagonal 130 or 132, for example. These patterns are shown in greater detail in FIGS. 8–15. Numerous other alternative embodiments also exist.

4. Alternative Laser Scan Line Patterns

FIGS. 8–15 are diagrams of back surface 22, which illustrate various laser scan line patterns within bands 126 and 127 according to alternative embodiments of the present invention. The same reference numerals are used in FIGS. 8–15 as were used in FIGS. 1–2,4 and 7 for the same or similar elements.

Figure 8:
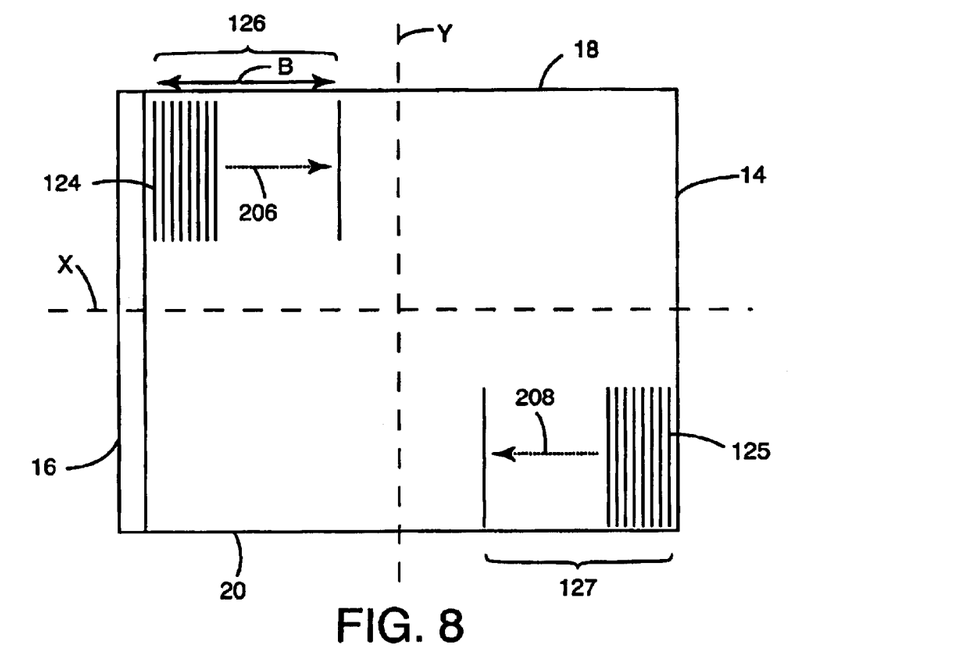
FIG. 8 is a diagram illustrating twist adjust bands having transversely extending laser scan lines, wherein the number of scan lines is adjusted along the longitudinal axis to obtain a desired change in twist.

In FIG. 8, twist adjust bands 126 and 127 are formed by a plurality of laser scan lines 124 and 125, which are oriented parallel to transverse axis Y. The length of each scan line 124 and 125 along transverse axis Y is fixed. The size, B, of bands 126 and 127 is increased as needed along longitudinal axis X by increasing the number of equidistant scan lines 124 and 125, as indicated by arrows 206 and 208. Bands 126 and 127 begin at trailing edge 16 and leading edge 14, respectively, and are expanded inwardly along longitudinal axis X. The amount of twist control is determined by the band size, B, given by (N-1) times the line-to-line spacing, where N is the number of equidistant scan lines in each band. The maximum size of each band is restricted by the available surface area for treatment, as well as any need to reserve surface area for control of other flatness parameters, such as crown and cross curvature. With the orientation of scan lines shown in FIG. 8, scan lines 124 and 125 have a primary effect on twist and a secondary effect on crown curvature along longitudinal axis X, with substantially no effect on cross curvature given a certain scan line dimension. Changes in the sequential order of forming laser scan lines 124 and 125 within bands 126 and 127 would likely produce similar twist control, but may effect the magnitude of the resulting change in twist. In FIG. 8, bands 126 and 127 have a maximum dimension of about 0.013 inches on each side of the band, for a 30-series slider. However, other dimensions can also be used.

Figure 9:
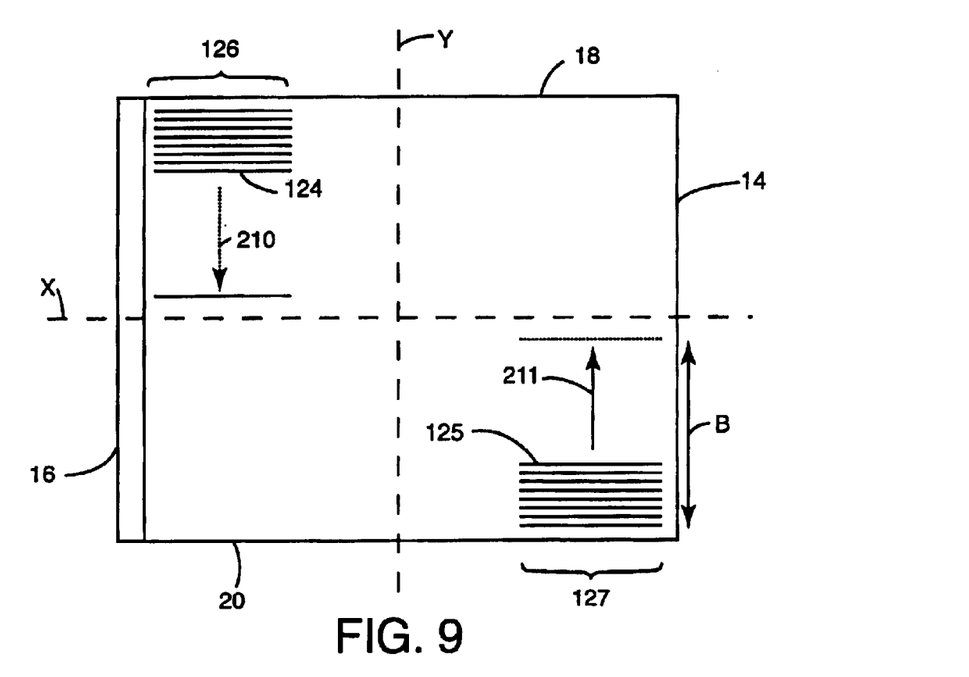
FIG. 9 is a diagram illustrating twist adjust bands having longitudinally extending laser scan lines, wherein the number of scan lines is adjusted along the transverse axis.

In FIG. 9, bands 126 and 127 are similar to those in FIG. 8, but scan lines 124 and 125 are oriented parallel to longitudinal axis X. The band size, B, is again used as the twist response input variable. The length of laser scan lines 124 and 125 and the spacing between adjacent scan lines are fixed. The amount of twist control is determined by the band size, B, which is adjusted by adjusting the number N of equidistant scan lines 124 and 125 along transverse axis Y, as indicated by arrows 210 and 211. With the scanning direction shown in FIG. 9, scan lines 124 and 125 have a primary effect on twist and a secondary effect on cross curvature along transverse axis Y, with substantially no effect on crown curvature along longitudinal axis X, given a certain scan line dimension.

Figure 10:
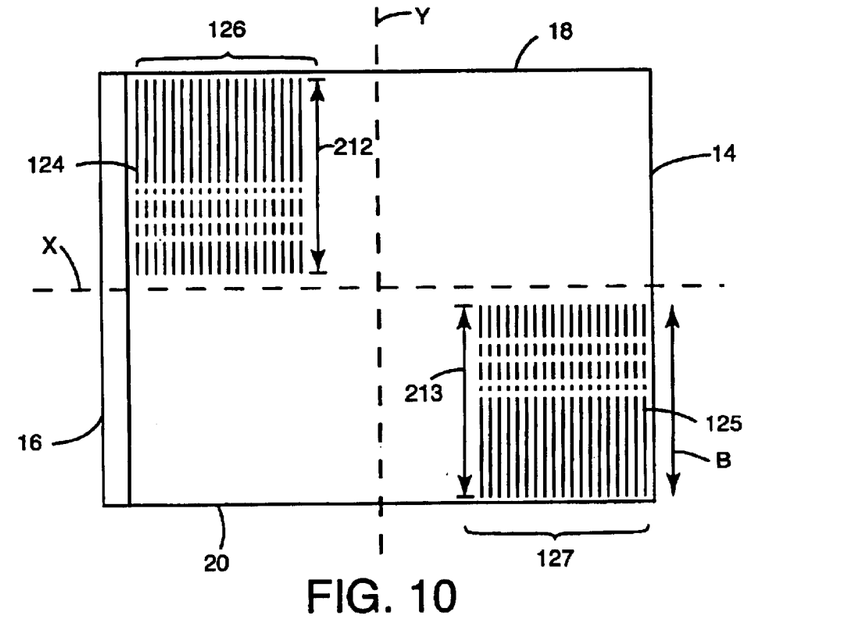
FIGS. 10 and 11 are diagrams illustrating twist adjust bands having transversely and longitudinally extending laser scan lines, respectively, wherein the lengths of the scan lines are adjusted to obtain a desired change in twist.

In FIG. 10, the length of laser scan lines 124 and 125 is adjusted to control the band size, B. Laser scan lines 124 and 125 are oriented parallel to transverse axis Y. The length of laser scan lines 124 and 125 are adjusted along transverse axis Y, as shown by arrows 212 and 213, respectively, to obtain a selected amount of twist change. The amount of twist control is therefore determined by the band size, B=L, where L is the length of each scan line 124 and 125. The maximum band size is determined by the maximum line length allowed by the user, which is based on other factors such as crown and cross curvature control. Given a proper band size, scanning in the direction parallel to transverse axis Y primarily effects twist and has a secondary effect on cross curvature.

Figure 11:
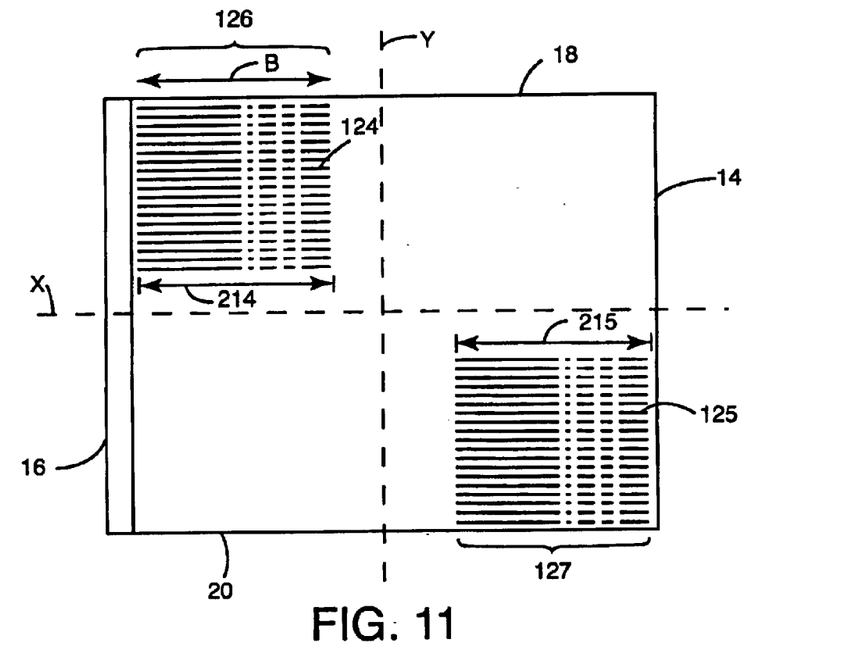

In FIG. 11, laser scan lines 124 and 125 are oriented parallel to longitudinal axis X, and the band size, B, is adjusted by varying the length of laser scan lines 124 and 125 along longitudinal axis X in the direction of arrows 214 and 215, respectively. Again, the maximum size of bands 126 and 127 is determined by the maximum line lengths allowed by the user. Scanning in the direction parallel to longitudinal 10 axis X primarily effects twist and has a secondary effect on crown curvature.

Figure 12:
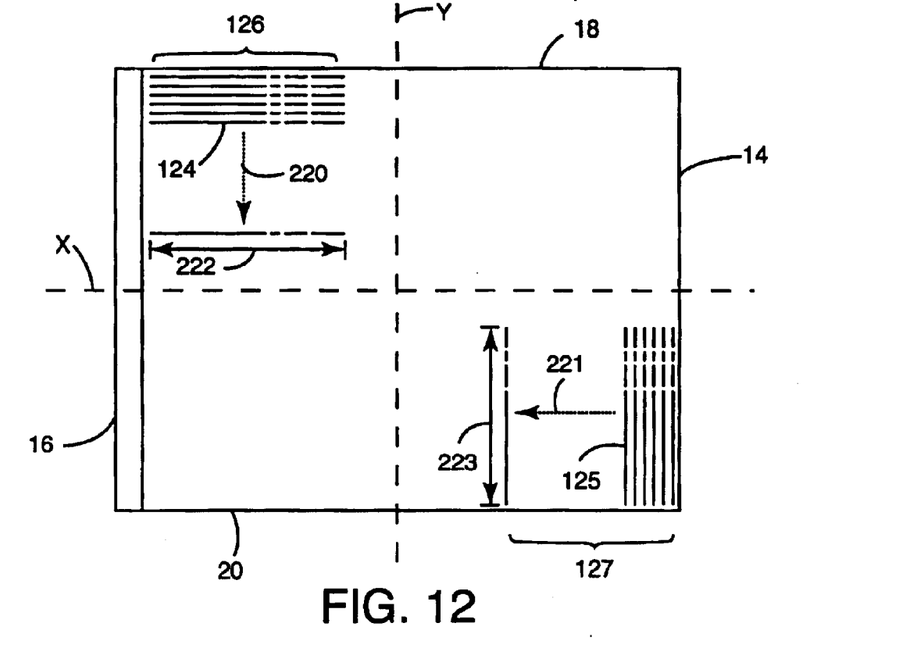
FIG. 12 is a diagram illustrating twist adjust bands in which the number of scan lines and the lengths of the scan lines are adjusted to obtain a desired change in twist.

In FIG. 12, the sizes of bands 126 and 127 are variable along both the longitudinal axis X and the transverse axis Y. The number, N, of laser scan lines 124 and 125 can be expanded in the directions indicated by arrows 220 and 221, and the length of each scan line 124 and 125 can be expanded in the directions indicated by arrows 222 and 223. In this embodiment both the scan line dimensions and the number of scan lines are variable. As discussed above, the scanning direction can be either parallel to longitudinal axis X, as shown by scan lines 124 in FIG. 12, or parallel to transverse axis Y, as shown by scan lines 125 in FIG. 12. Also, the scan lines in band 126 can have the same orientation as the scan lines in band 127, or an orientation different than the scan lines in band 127. The laser scan line pattern shown in FIG. 12 would have a secondary influence on both crown curvature and cross curvature.

Figure 13:
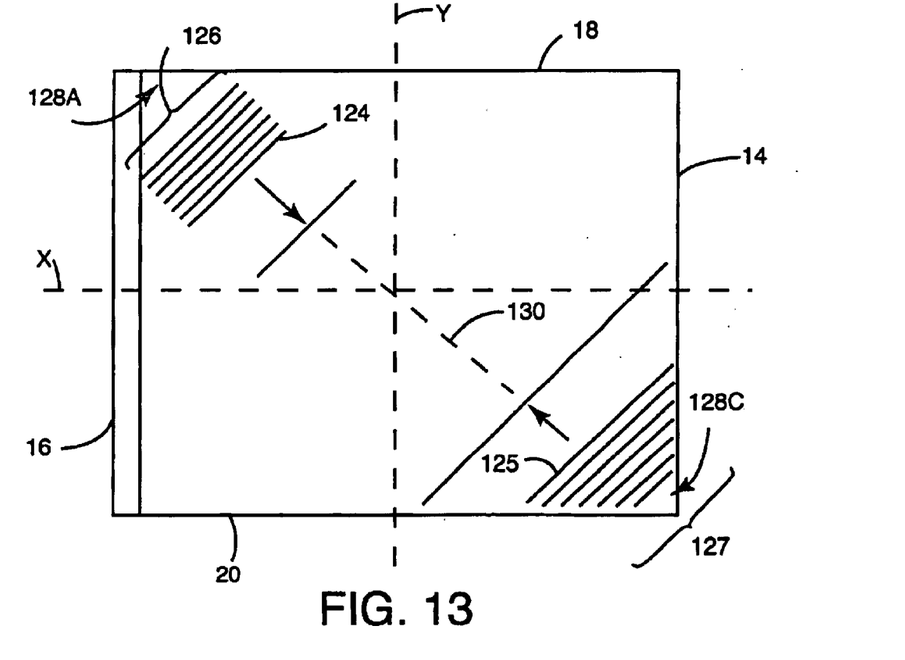
FIG. 13 is a diagram illustrating twist adjust bands in which the scan lines are oriented perpendicular to a diagonal of the slider's working surface.

In FIG. 13, laser scan lines 124 and 125 are oriented perpendicular to diagonal 130. The scan lines begin at corners 128A and 128C, and proceed towards the center of the slider surface being treated. Multiple configurations using this method are possible. The laser scan lines can have fixed dimensions, such as laser scan lines 124 in FIG. 13 or can have variable dimensions, such as laser scan lines 125 in FIG. 13. Also, the number of scan lines in each band 126 and 127 can be fixed or variable. The laser scan line pattern shown in FIG. 13 has a secondary influence on both crown curvature and cross curvature.

Figure 14:
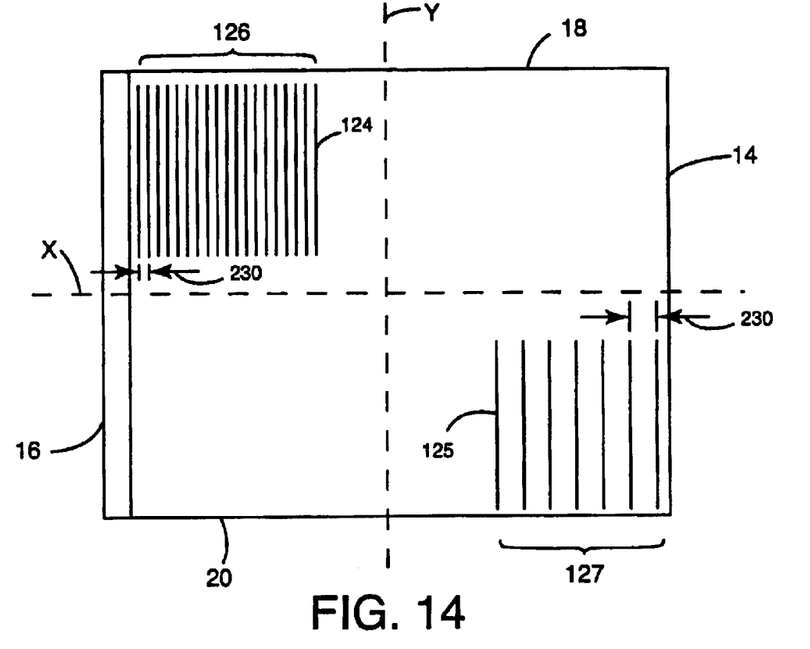
FIG. 14 is a diagram illustrating twist adjust bands in which the spacing between the laser scan lines is adjusted to obtain a desired change in twist.
Figure 15:
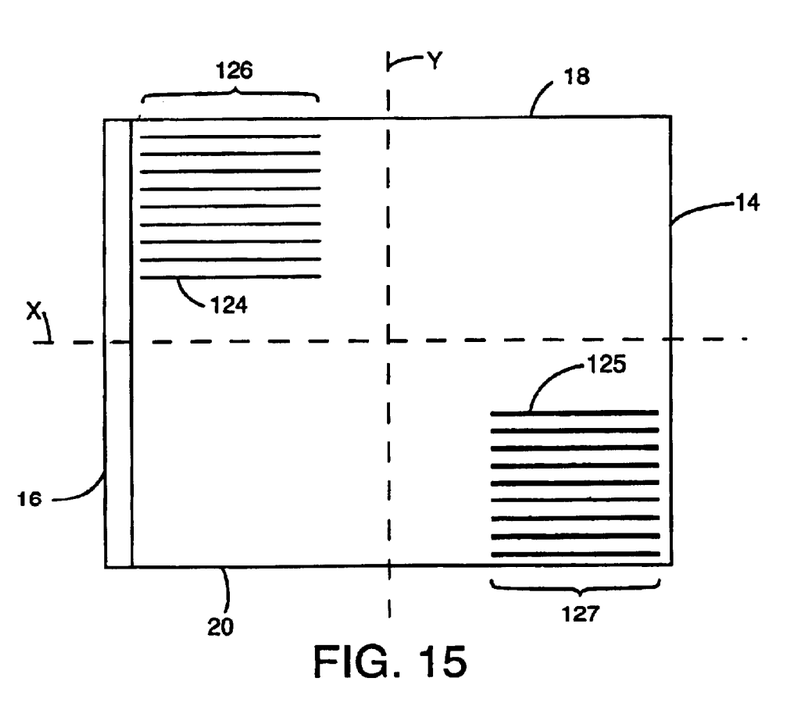
FIG. 15 is a diagram illustrating twist adjust bands in which the thickness of the laser scan lines is adjusted to obtain a desired change in twist.

In yet another series of embodiments shown in FIGS. 14 and 15, the band dimensions are fixed. In these embodiments, process control variables can include the line-to-line spacing (line density and number of lines per band), power and scanning speed, for example. In FIG. 14, the dimensions of bands 126 and 127 are fixed, and scanning is oriented along transverse axis Y. The process variable used in this layout is line-to-line spacing 230. With narrow line spacing, a band similar to band 126 is produced. With wider spacing, a less dense band is produced, similar to band 127. The scanning orientation can be either parallel to transverse axis Y or longitudinal axis X.

In FIG. 15, the dimensions of bands 126 and 127 and the line-to-line spacing are fixed, but the power or scanning speed is varied to produce a variable line thickness from one slider to the next. Again, scanning can be oriented either parallel to transverse axis Y or longitudinal axis X. Thin scan lines 124 reflect scanning with a lower power or a higher scanning speed. Thick laser scan lines 125 reflect scanning with a higher power or a lower scanning speed. Both bands 126 and 127 are preferably formed with the same power level and scanning speed for a particular slider.

Figure 16:
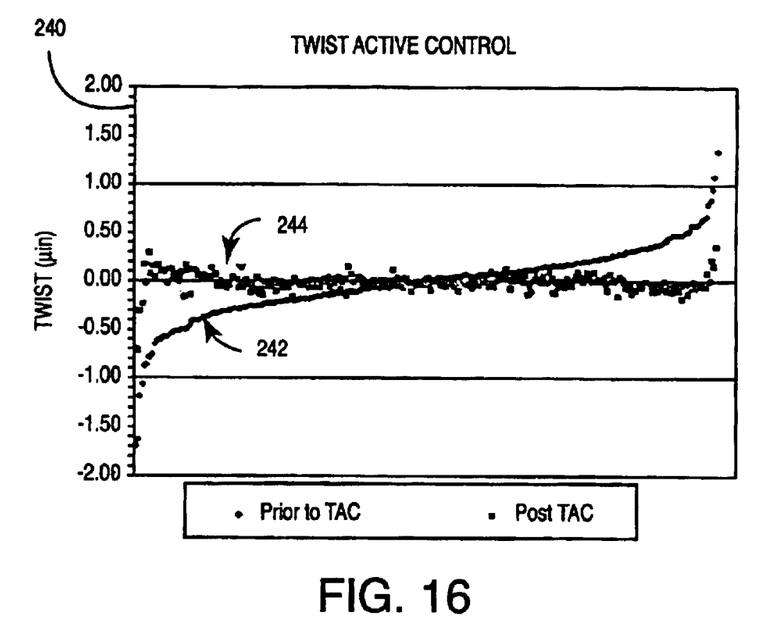
FIG. 16 is a graph illustrating test data from various sliders using the twist control treatment pattern shown in FIG. 8.

FIG. 16 is a graph illustrating test data from various sliders using the twist control treatment pattern shown in FIG. 8. The test data was collected using a laser with a power intensity of $1.5 \times 10^6$ W/cm$^2$ at a scanning speed of 500 mm/sec. Axis 240 represents twist in microinches. The collection of sample points indicated by arrow 242 represents a collection of sliders having an even distribution of the "incoming" twist values between +/−1.5 microinches. The collection of sample points indicated by arrow 244 represent the adjusted twist values for those sliders after the laser scan pattern shown in FIG. 8 was applied to each slider. The number of scan lines in each treatment band was selected for each slider to obtain a target twist value of zero microinches. As can be seen by FIG. 16, the final twist values are fairly closely distributed about zero microinches.

5. Design Curves for Twist Control

A design curve is a mathematical model that can be used to predict the outcome of a function based on the input variables to the model. For the process of adjusting the twist of a magnetic or optical head slider, the desired outcome is a twist magnitude. The input variables to this process include all process factors that can be adjusted individually or collectively in order to bring about the desired outcome. Given a constant slider substrate material, these input variables include laser operating mode, laser power, focused laser beam spot size, laser beam scanning speed, line-to-line spacing (line pitch, P), number of scan lines(N), scan band size and location, initial material stress conditions on the working surface of the slider and any interactions between these variables. Since measuring device 111 is assumed to be gage capable and produces accurate and repeatable measurements, it is not included as an input variable to the model.

For better process control, some of these input variables may be preferred as process control inputs over other input variables. Also, the process model can be simplified by fixing some of these input variables and assuming other variables are constant, or at least within a certain range, so that they may be eliminated from the model. A description of each of these input variables is provided below.

a. Laser Operating Mode

Light source 112 can be operated in a continuous wave mode or a pulsed mode. These modes produce different curvature responses. In the continuous wave mode, a laser beam having a wavelength in the infrared range would provide enough heating of the slider surface without material removal. In contrast, pulsed or Q-switched lasers emit pulses with high-peak power (energy sustained over a very short period of time (ns)). This would usually result in deeper laser pockets and a smaller heat-effected zone, which would result in smaller induced tensile stresses as compared to the tensile stresses induced by a continuous wave laser beam. The laser spots could be pulsed at a high frequency to produce a continuous-like burn line, but such a line can suffer from internal cracks that can cause a relief in the induced tensile stresses and therefore, a smaller curvature change.

According to one specific example of the present invention, light source 112 delivers continuous-wave laser beam having a power of about 5 watts and a wavelength around 1100 nm. This laser beam is used to scan a burn line that has a melting penetration depth (MPD), which is ten times smaller than that obtained with a pulsed laser being scanned at the same speed. Such scan lines obtained with a continuous wave laser beam are virtually crack-free and result in at least a 50% increase in resulting curvature change over a pulsed laser. Another advantage of a continuous wave laser beam is that a continuous wave laser beam has greater power stability as compared to the pulse-to-pulse energy fluctuations of a pulsed laser, even when the pumping method is the same. Power stability directly influences the accuracy of curvature response models and hence, the predictability of the process.

b. Focused Spot Size

The combination of laser power and laser spot size determines the scan line width and penetration depth. Since the twist response is sensitive to the location of the scan lines, small steps in twist change (i.e. high resolution) can be accomplished by using narrow and well defined scan lines that can realize very localized compressive stress removal and tensile stress addition. The smaller the focused spot size, the narrower the scan line. With a narrower scan line, less laser power is required. The focused spot size of a continuous wave can be used as a process control input, but is less preferred since variations in the spot size result in variations in the power density (power per unit area) and hence variations in the design curve. In addition, varying the spot size necessitates moving machine components, which is susceptible to wear and misalignment.

c. Laser Power

The laser power is another process control input that can be used to alter the twist magnitude. By applying higher power, a higher twist response is obtained. However, changing the laser power results in a power density change. Therefore, the effects on the design curve due to laser power variations are similar to those seen with spot size variations. Also, the twist response is saturated at higher power levels and is zero at lower power levels. This limits the range over which this variable is effective in controlling the process. In addition, at moderate power levels, a twist change may not occur with every unit of power increase. Larger power level step increases are required to induce a twist change. Since the use of laser power as a control input may not produce an accurate curvature model, power is fixed in a one embodiment of the present invention.

d. Scanning Speed

Scanning speed is the speed at which scanner 116 (shown in FIG. 4) moves beam 120 over the slider surface being treated. Higher scanning speeds normally result in a smaller twist responses and vice-versa. Since this variable affects the line characteristics, similar to the laser spot size and laser power variables, this variable is not used as a process control input in one embodiment of the present invention.

e. Scanning Orientation

In one embodiment of the present invention, which is shown in FIG. 8, scanning is oriented in a direction parallel to the transverse axis of the slider body. Scanning in this direction offers higher twist responses for the same band size than scanning parallel to the longitudinal axis. Furthermore, this direction has a beneficial secondary effect on crown curvature. For simplicity, this orientation is assumed to be fixed and is not used as a variable in the design model.

f. Pre-Stress Conditions

The initial stress conditions of the slider prior to laser heat treatment can influence the absolute outcome of the twist response magnitude, but does not influence the behavior or trend of the twist response. Since the pre-stress conditions do not affect the model behavior, these variables are not included in the design model.

Generally, the majority of sliders (e.g., 95%) in a typical fabrication process have stress conditions that are similar to one another. Variations in the initial stress conditions can be absorbed to a large extent by the process tolerances. However, these variations can be included in the model if tighter specifications are desired.

g. Line-to-Line Spacing (P), Number of Lines (N), and Scan Band Size (B)

The scan band size B is an integration of both the line-to-line spacing P and the number of scan lines N in the band. Thus, the scan band size is given by:

$$B = P \times (N-1) \qquad \text{Eq. 1}$$

From Eq. 1, various embodiments are possible, as shown in FIGS. 8–15, for example. In one embodiment, the band size is fixed to a maximum, and either P or N (but not both) is used as the process input variable in the mathematical prediction model. In the case where P is used as the input variable, N will be deduced from Eq. 1 and vice-versa. With this embodiment, respective bands of the melt pattern will originate and terminate at the same locations on the surface being treated.

In another embodiment, N is fixed and B or P is allowed to vary. With this embodiment, there are several possible configurations. In one configuration, the band will always start at a first end (such as an outer limit) of the designated area of the burn pattern and subsequent scan lines in the band progress towards the other end (such as the inner limit) of the designated area. The band will have a fixed number of scan lines, but the line spacing or pitch "P" differs from one slider to the next. In another configuration, the band always starts at the second end (such as the inner limit) of the designated area and progresses towards the first end, (such as the outer limit). In yet another configuration, the band will always start with a scan line at a central location within the designated area and progress alternately toward both the inner and outer limits.

In another embodiment, P is fixed and N or B is used as the process input variable. The same band configurations discussed above also apply to this embodiment. With this embodiment, scan lines will always be spaced the same distance apart, from one slider to the next and the number of scan lines, N, is used as the input variable. In yet another embodiment, a melt pattern may be formed by various combinations of each of the embodiments and configurations discussed above.

In view of the small physical dimensions of a typical slider and the anisotropic nature of the row slice stresses on the surface being treated, one preferred embodiment of the present invention shown in FIG. 8 uses the number of scan lines, N, as the sole process input variable. The line-to-line spacing, P, is fixed, and the scan band size, B, varies proportionally with N. All bands on the melt pattern shown in FIG. 8 start from the outer limit and grow toward the inner limit of the designated area on the pattern with each successive scan line, and scanning is performed in a direction parallel to the transverse axis Y.

Figure 17:
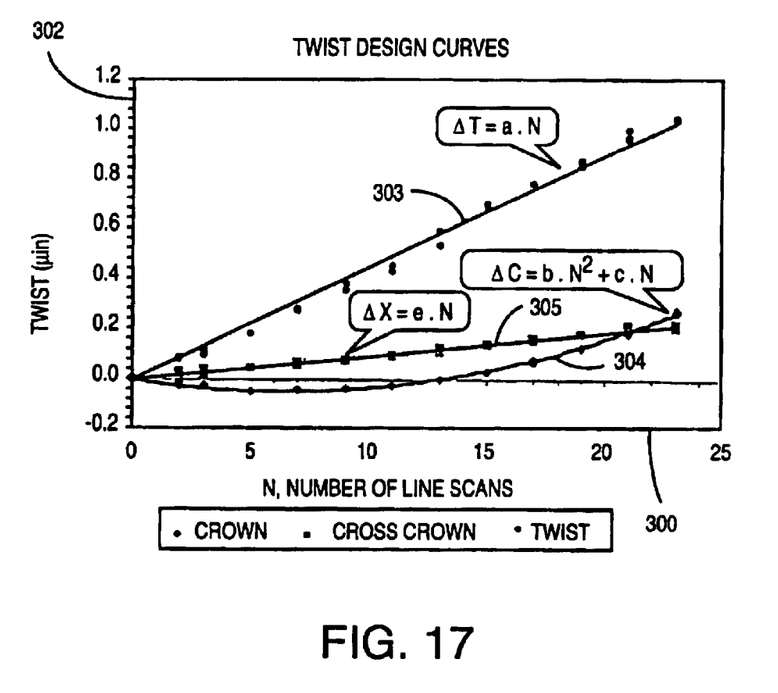
FIG. 17 is a graph illustrating twist response as a result of progressively increasing the number of equidistant scan lines within each of the bands shown in FIG. 8.

6. Mathematical Model for the Twist Response Where the Number of Scan Lines N is the Sole Input Variable FIG. 17 is a graph illustrating the twist response as a result of progressively increasing the number of equidistant scan lines within each of the bands shown in FIG. 8. X-axis 300 represents the number of scan lines, N, and Y-axis 302 represents change in microinches. Line 303 represents the change in twist, $\Delta T$, line 304 represents the change in crown curvature, $\Delta C$, and line 305 represents the change in cross curvature, $\Delta X$. During the twist adjustment step, the change in twist is accompanied by a small change in crown and cross curvature. These small changes in crown and cross curvature are generally positive when the laser heat treatment is carried out on the back surface of the slider. The changes in crown and cross curvature are no more than 20% of the total twist change, and can be taken into account during previous or subsequent crown and/or cross curvature control steps. The change in twist can be positive or negative, depending on the diagonal on which the treatment is applied, the surface of the slider being treated and the adopted measurement convention. Line 303 can be approximated by the equation, $\Delta T = A \cdot N$, where A is a constant. Line 304 can be approximated by $\Delta C = B \cdot N^2 + C \cdot N$, where B and C are constants. Line 305 can be approximated by the equation, $\Delta X = E \cdot N$, where E is a constant.

Given these equations for the twist response, the twist control algorithm implemented by apparatus 110, shown in FIG. 4, can calculate the appropriate number of scan lines to form within each twist adjustment band for a particular slider based on the measured incoming twist value for that slider and the predetermined target twist value. The difference between these two values determines the desired change in twist, $\Delta T$, from which the number of lines, N, can be calculated. Similar equations can be derived for use with other input variables.

7. Summary

Curvature adjustment apparatus 110 shown in FIG. 4 implements a process where an incoming flatness parameter, such as twist, of a disc head slider can be adjusted to an outgoing desired specification. The apparatus uses a high quality focused continuous wave laser beam for treating specific regions of the surface of the slider under treatment. The combination of using very narrow and well defined laser marks and properly defined treatment regions on the slider surface provides for improved resolution and accuracy in obtaining desired twist magnitude targets.

It is to be understood that even though numerous characteristics and advantages of various embodiments of the present invention have been set forth in the foregoing description, together with details of the structure and function of various embodiments of the invention, this disclosure is illustrative only, and changes may be made in details, especially in matters of structure and arrangement of parts within the principles of the present invention to the full extent indicated by the broad general meaning of the terms in which the appended claims are expressed. For example, any method of producing localized changes in material stresses can be used with the present invention. One method of adjusting twist is to use heat from a continuous or non-continuous wave laser source in a selected pattern to produce localized changes in stress on the back surface of the slider. However, heat sources other than a laser can also be used to create localized changes in surface stress. Further, the surface stresses can be altered with techniques other than the use of heat. For example, various methods of surface shaping can be used, such as lapping, shot pinning, sand blasting, liquid honing, etc. The surface shaping mechanism can be selected to suit a particular application.

What is claimed is:

1. An apparatus for adjusting twist curvature of a slider having a bearing surface, a back surface, which is opposite to the bearing surface, a longitudinal axis and a transverse axis, the apparatus comprising:
    a light source adapted to produce a light beam capable of altering material stresses in a working surface of the slider, wherein the working surface comprises the bearing surface or the back surface; and
    means for obtaining a measure of the twist curvature of the bearing surface and for scanning the light beam across the working surface in a pattern selected to alter material stresses in the working surface asymmetrically with respect to the longitudinal axis and the transverse axis based on the measure of the twist curvature so as to induce a change in the twist curvature.

2. The apparatus of claim 1 wherein the light source comprises a continuous wave laser beam source.

3. The apparatus of claim 2 wherein the means for scanning comprises:
    means for scanning a laser beam spot produced by the continuous wave laser beam source along the working surface of the slider to melt the working surface along a plurality of parallel laser scan lines within a twist control band, wherein the twist control band is located on the working surface asymmetrically with respect to the longitudinal axis and the transverse axis; and
    means for controlling a number of the plurality of lines within the twist control band as a function of the measure of twist curvature.

4. The apparatus of claim 1 wherein the means for scanning comprises:
    means for selectively scanning the light beam along a plurality of lines within a first twist control band on the working surface of the slider, wherein the first twist control band is located on the working surface asymmetrically with respect to the longitudinal axis and the transverse axis.

5. The apparatus of claim 4 wherein the working surface is rectangular and has four corners and first and second diagonals extending between opposing ones of the four corners and wherein the means for selectively scanning further comprises:
    means for positioning the first twist control band generally along the first diagonal such that the change in twist curvature is in a first direction, if the measure of the twist curvature is positive; and
    means for positioning the first twist control band generally along the second diagonal such that the change in twist curvature is in a second direction, opposite to the first direction, if the measure of the twist curvature is negative.

6. The apparatus of claim 5 wherein the means for selectively scanning further comprises:
    means for selectively scanning the light beam along a plurality of lines within a second twist control band on the working surface of the slider;
    means for positioning the first and second twist control bands in first and second opposing ones of the four corners, generally along the first diagonal such that the change in twist curvature is in the first direction, if the measure of the twist curvature is positive; and
    means for positioning the first and second twist control bands in second and third opposing ones of the four corners, generally along the second diagonal such that the change in twist curvature is in the second direction, opposite to the first direction, if the measure of the twist curvature is negative.

7. The apparatus of claim 5 wherein the means for scanning further comprises:
    means for orienting the plurality of lines parallel to the longitudinal axis.

8. The apparatus of claim 5 wherein the means for scanning further comprises:
    means for orienting the plurality of lines parallel to the transverse axis.

9. The apparatus of claim 5 wherein the means for scanning further comprises:
    means for orienting the plurality of lines parallel to the first diagonal if the measure of the twist curvature is positive and parallel to the second diagonal if the measure of the twist curvature is negative.

10. The apparatus of claim 4 wherein the means for scanning further comprises:
    means for orienting the plurality of lines parallel to one another within the first twist control band; and
    means for controlling a number of the plurality of lines within the first twist control band as a function of the measure of twist.

11. The apparatus of claim 4 wherein the means for scanning further comprises:
    means for orienting the plurality of lines parallel to one another within the first twist control band; and
    means for controlling spacing between the plurality of lines within the first twist control band as a function of the measure of twist curvature.

12. The apparatus of claim 4 wherein the means for scanning further comprises:
    means for orienting the plurality of lines parallel to one another within the first twist control band, wherein the plurality of lines together have an outer dimension that defines the area on the working surface consumed by the first twist control band; and means for controlling a number of the plurality of lines and spacing between the plurality of lines within the first twist control band as a function of the measure of twist curvature, while keeping the area consumed by the first twist control band constant.

13. The apparatus of claim 4 wherein the means for scanning further comprises:

means for orienting the plurality of lines parallel to one another within the first twist control band; and means for controlling a length of each of the plurality of lines within the first twist control band as a function of the measure of twist curvature.

14. The apparatus of claim 4 wherein the means for scanning further comprises:

means for orienting the plurality of lines parallel to one another within the first twist control band; and means for controlling a width of each of the plurality of lines Within the first twist control band as a function of the measure of twist curvature.

* * * * *